(12) United States Patent
Nakatani

(10) Patent No.: US 9,473,662 B2
(45) Date of Patent: Oct. 18, 2016

(54) IMAGE FORMING APPARATUS HAVING A USAGE RESTRICTION AND IMAGE FORMING SYSTEM INCLUDING THE SAME

(71) Applicant: KYOCERA Document Solutions Inc., Osaka (JP)

(72) Inventor: Takanobu Nakatani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/867,848

(22) Filed: Sep. 28, 2015

(65) Prior Publication Data

US 2016/0094751 A1 Mar. 31, 2016

(30) Foreign Application Priority Data

Sep. 29, 2014 (JP) .................. 2014-198878

(51) Int. Cl.
*H04N 1/00* (2006.01)
*H04N 1/32* (2006.01)
*G06Q 30/02* (2012.01)

(52) U.S. Cl.
CPC ...... *H04N 1/00925* (2013.01); *G06Q 30/0226* (2013.01); *H04N 1/00244* (2013.01); *H04N 1/00323* (2013.01); *H04N 1/00477* (2013.01); *H04N 1/00832* (2013.01); *H04N 1/32101* (2013.01); *H04N 2201/0094* (2013.01)

(58) Field of Classification Search
CPC ..................... H04N 1/00925; H04N 1/00477; H04N 1/00832; H04N 1/00323; H04N 1/00244; H04N 1/32101; H04N 2201/0094; G06Q 30/0226
USPC ......... 358/1.13–1.15; 705/14.1, 14.27, 14.31
See application file for complete search history.

(56) References Cited

FOREIGN PATENT DOCUMENTS

JP 2006-123169 A 5/2006

*Primary Examiner* — Kent Yip
(74) *Attorney, Agent, or Firm* — Studebaker & Brackett PC

(57) ABSTRACT

An image forming apparatus has a plurality of functions that includes at least one predetermined function on which a usage restriction is imposed. The image forming apparatus includes a printing section and a control section. The printing section supplies toner to an electrostatic latent image to develop the electrostatic latent image into a toner image and print the toner image on a sheet. The control section counts sheets printed by the printing section and removes the usage restriction on the at least one predetermined function when a cumulative number of sheets printed by the printing section reaches a predetermined number.

4 Claims, 7 Drawing Sheets

8, 81

LS

Ranking

LT

| Rank | No of Sheets Printed |
|---|---|
| 1 | 2000 |
| 2 (this MFP) | 1500 |
| 3 | 1000 |
| 4 | 800 |
| ⋮ | |

Close

FIG. 6

IMAGE FORMING APPARATUS HAVING A USAGE RESTRICTION AND IMAGE FORMING SYSTEM INCLUDING THE SAME

INCORPORATION BY REFERENCE

The present application claims priority under 35 U.S.C. §119 to Japanese Patent Application No. 2014-198878, filed Sep. 29, 2014. The contents of this application are incorporated herein by reference in their entirety.

BACKGROUND

The present disclosure relates to an image forming apparatus that prints a toner image on a sheet and also to an image forming system that includes the image forming apparatus.

A known image forming apparatus can give users an incentive to use the image forming apparatus.

The image forming apparatus includes a lottery section that determines whether or not to hold a lottery drawing for a prize each time the image forming section executes a print job. The probability at which the lottery drawing is held for a print job increases for a larger number of sheets printed in the print job. When a lottery drawing is held and a win is drawn, the image forming apparatus outputs an exchange ticket for a prize.

SUMMARY

According to a first aspect of the present disclosure, an image forming apparatus has a plurality of functions that includes at least one predetermined function on which a usage restriction is imposed. The image forming apparatus includes a printing section and a control section. The printing section supplies toner to an electrostatic latent image to develop the electrostatic latent image into a toner image and print the toner image on a sheet. The control section counts sheets printed by the printing section and removes the usage restriction on the at least one predetermined function when a cumulative number of sheets printed by the printing section reaches a predetermined number.

According to a second aspect of the present disclosure, an image forming apparatus includes a plurality of image forming apparatuses each according to the first aspect of the present disclosure and a server. The server is communicatively connected to the plurality of image forming apparatuses and receives, from each of the image forming apparatuses, information indicating a cumulative number of sheets printed by the image forming apparatus. Each of the image forming apparatuses includes a display section for displaying information. The server determines, for each of the image forming apparatuses, a number of sheets printed during a determination period having a duration set in advance for the determination of the number of sheets, ranks the plurality of image forming apparatuses in decreasing order of the number of sheets determined to have been printed during the determination period, and transmits ranking information to each of the image forming apparatuses, the ranking information indicating ranks of the respective image forming apparatuses. On receiving the ranking information from the server, each of the image forming apparatuses displays a ranking table generated according to the ranking information on the display section.

BRIEF DESCRIPTION OF THE DRAWINGS

FIG. 6 shows an example of a ranking screen displayed on the operation panel of the multifunction peripheral according to the embodiment of the present disclosure.

DETAILED DESCRIPTION

An embodiment of the present disclosure is described by way of an example directed to a multifunction peripheral that can execute jobs such as print jobs and copy jobs.

<Overall Structure of Multifunction Peripheral>

Figure 1:
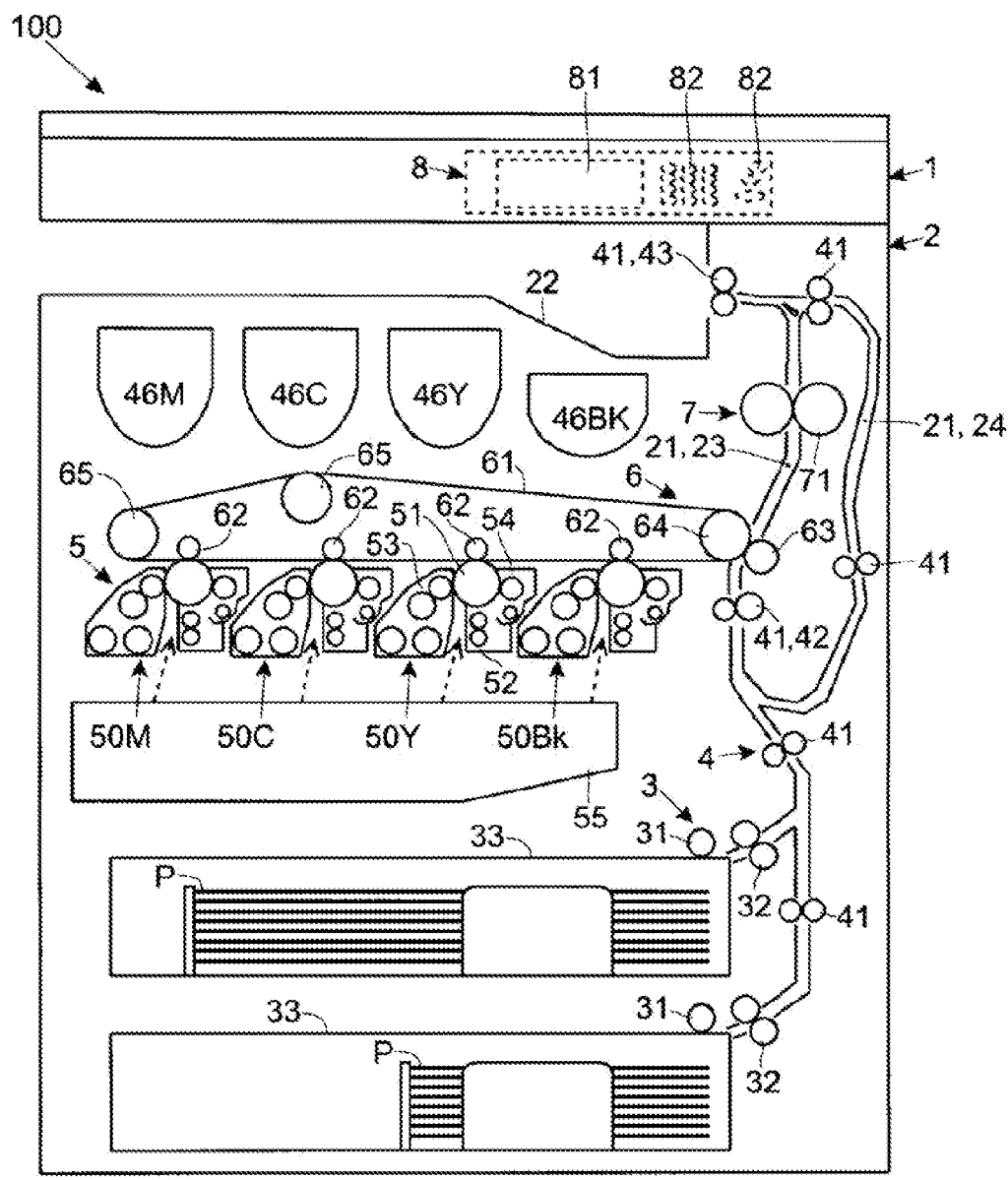
FIG. 1 is a schematic view of a multifunction peripheral according to an embodiment of the present disclosure.

As shown in FIG. 1, a multifunction peripheral 100 that is an example of an image forming apparatus includes an image reading section 1 and a printing section 2. The printing section 2 includes a sheet feed section 3, a sheet conveyance section 4, an image forming section 5, a transfer section 6, and a fixing section 7. The image reading section 1 reads a document to generate image data representing an image of the document. The printing section 2 conveys a sheet P through a sheet conveyance path 21. The printing section 2 prints an image based on the image data on the sheet P being conveyed. The printing section 2 then discharges the printed sheet P to an exit tray 22.

The sheet conveyance path 21 includes a main conveyance path 23 and a reverse conveyance path 24. The main conveyance path 23 is used in both single-sided printing of printing an image on one side of a sheet P and duplex printing of printing an image on both sides of a sheet P. The sheet P is discharged to the exit tray 22 after passing through a transfer nip and a fixing nip located on the main conveyance path 23. The transfer nip and the fixing nip will be described later in detail. The reverse conveyance path 24 is used in duplex printing of printing an image on both sides of a sheet P. The reverse conveyance path 24 connects a location downstream of the fixing nip and a location upstream of a pair of registration rollers 42, which will be described later, in terms of a conveyance direction of a sheet P.

The sheet feed section 3 includes a plurality of pickup rollers 31 and a plurality of pairs of sheet feed rollers 32. The sheet feed section 3 feeds sheets P loaded in sheet feed cassettes 33 one at a time to the main conveyance path 23 of the sheet conveyance path 21. The sheet conveyance section 4 includes a plurality of pairs of conveyance rollers 41. The sheet conveyance section 4 conveys a sheet P through the sheet conveyance path 21. The plurality of pairs of conveyance rollers 41 include the pair of registration rollers 42 mentioned above. The pair of registration rollers 42 is a pair of conveyance rollers 41 located upstream of the transfer nip in terms of the conveyance direction of a sheet P.

The image forming section 5 includes mechanism units 50Bk, 50Y, 50C, and 50M respectively for the colors of black (Bk), yellow (Y), cyan (C), and magenta (M). The mechanism units 50Bk, 50Y, 50C, and 50M each includes a photosensitive drum 51, a charging device 52, a developing device 53, and a drum cleaning device 54. The mechanism units 50Bk, 50Y, 50C, and 50M are disposed such that the circumferential surfaces of the respective photosensitive drums 51 are in contact with an intermediate transfer belt 61. The intermediate transfer belt 61 will be described later. The image forming section 5 includes an exposure device 55 commonly used for forming images of the respective colors. Toner containers 46Bk, 46Y, 46C, and 46M are each loaded with toner of a corresponding color.

For forming an image on a sheet P, each photosensitive drum 51 rotates. The charging device 52 charges the circumferential surface of the photosensitive drum 51. The exposure device 55 exposes the circumferential surface of the photosensitive drum 51 with light to form an electrostatic latent image on the photosensitive drum 51. The developing device 53 supplies toner to the electrostatic latent image formed on the circumferential surface of the photosensitive drum 51 to develop the electrostatic latent image into a toner image. The drum cleaning device 54 removes residues such as toner from the circumferential surface of the photosensitive drum 51.

The transfer section 6 includes the intermediate transfer belt 61 mentioned above, a plurality of primary transfer rollers 62, and a secondary transfer roller 63. The intermediate transfer belt 61 is stretched around a drive roller 64 and a driven roller 65. The primary transfer rollers 62 are located inside the running path of the intermediate transfer belt 61. The intermediate transfer belt 61 is sandwiched between each of the primary transfer rollers 62 and a corresponding one of the photosensitive drums 51. The secondary transfer roller 63 is located opposite to the drive roller 64 with the intermediate transfer belt 61 in between. The secondary transfer roller 63 and the drive roller 64 form a transfer nip.

The image forming section 5 performs primary transfer of the toner images of transferring the respective colors formed on the circumferential surfaces of the photosensitive drums 51 to the intermediate transfer belt 61 such that the toner images are overlaid on one another. Then, the transfer section 6 performs secondary transfer of transferring the toner images overlaid on the circumferential surface of the intermediate transfer belt 61 to a sheet P while the sheet P passes through the transfer nip.

The fixing section 7 includes a pair of fixing rollers 71. The pair of fixing rollers 71 forms a fixing nip. One of the fixing rollers 71 is provided with a heat source located in its interior space and pressed by the other one of the fixing rollers 71. The fixing section 7 applies heat and pressure to a sheet P as the sheet P passes through the fixing nip, thereby fixing the toner images transferred to the sheet P through the secondary transfer.

In single-sided printing, a sheet P having an image printed on one side is passed through the fixing nip and then ejected to the exit tray 22 without printing an image on the other side. In duplex printing, a sheet P having an image printed on one side is passed through the fixing nip and then conveyed into the reverse conveyance path 24 to reverse the sides of the sheet P.

More specifically, in duplex printing, a sheet P having an image printed on one side is once conveyed toward the exit tray 22. Then, before the sheet P fully passes through the pair of conveyance rollers 43 (that is a pair of conveyance rollers 41 located most downstream in the main conveyance path 23 out of the pairs of conveyance rollers 41 in terms of the conveyance direction of a sheet P), the conveyance is reversed and the sheet P is conveyed to the conveyance path 24. The sheet P having the image printed on the one side is conveyed through the reverse conveyance path 24 and returned into the main conveyance path 23 at a location upstream from the transfer nip. Then, the sheet P having the image printed on the one side is conveyed through the main conveyance path 23 and again passed through the transfer nip and the fixing nip. The sheet P is conveyed with a reversed side facing toward the intermediate transfer belt 61. Consequently, the sheet P conveyed through the reverse conveyance path 24 is printed on the reversed side on which no image has been printed yet.

The multifunction peripheral 100 includes an operation panel 8. The operation panel 8 includes a liquid crystal display panel 81 provided with a touch panel. The liquid crystal display panel 81 displays soft keys, which are used for receiving various settings, and messages. The operation panel 8 is also provided with hard keys 82, including a start key and numeric keys. The operation panel 8 corresponds to a receiving section and a display section.

Figure 2:
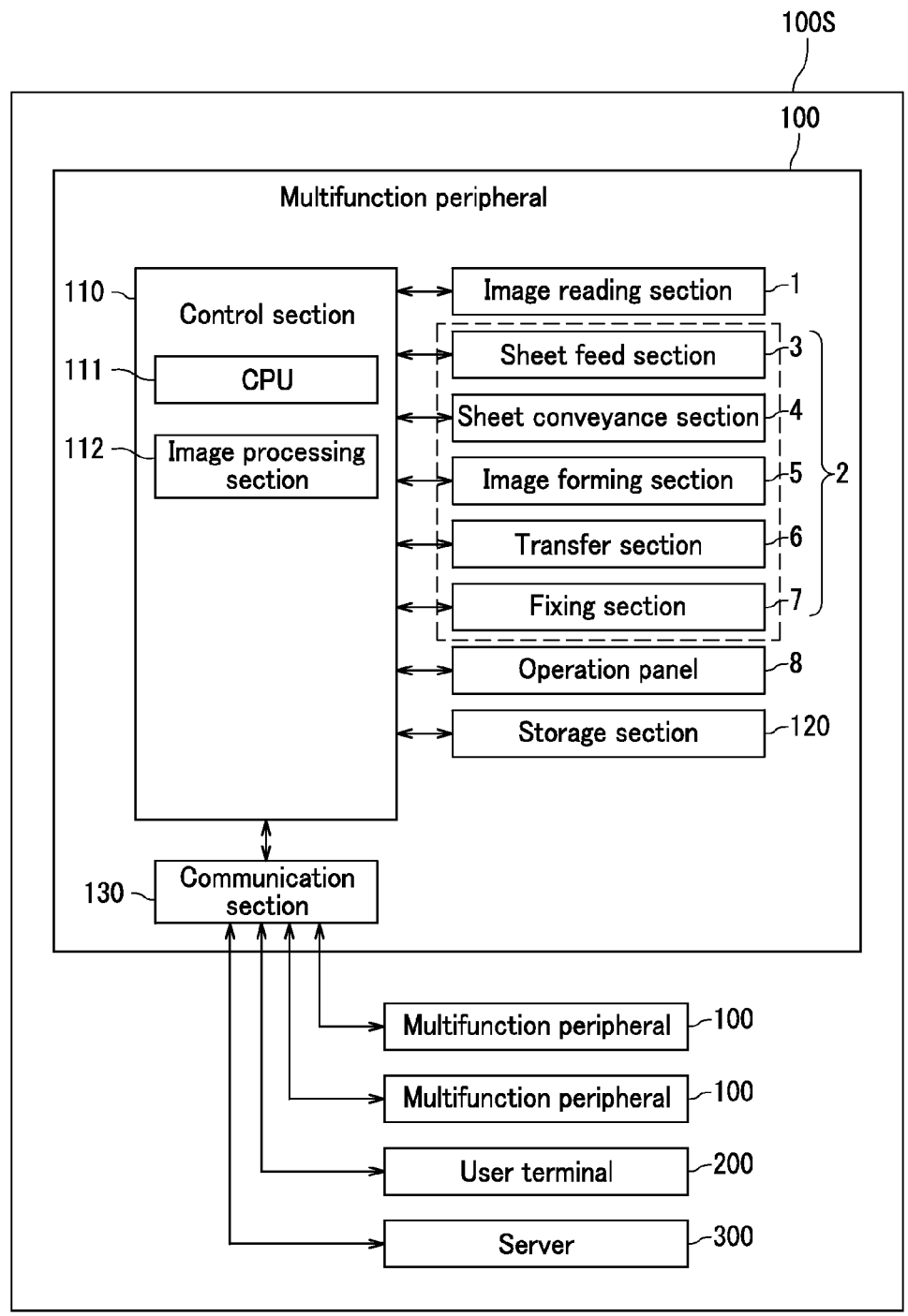
FIG. 2 is a block diagram of a hardware configuration of the multifunction peripheral according to the embodiment of the present disclosure.

The multifunction peripheral 100 additionally includes a control section 110 as shown in FIG. 2. The control section 110 includes a CPU 111 and an image processing section 112. The control section 110 controls reading operation of the image reading section 1 and printing operation of the printing section 2. The control section 110 controls display operation of the operation panel 8. Additionally, the control section 110 detects operations made by a user on the operation panel 8. The image processing section 112 of the control section 110 performs various types of image processing on image data.

The control section 110 is connected to a storage section 120 and a communication section 130. The storage section 120 stores control programs and data. The control section 110 controls the sections of the multifunction peripheral 100 based on the control programs and data stored in the storage section 120.

The communication section 130 is communicatively connected to a user terminal 200. The communication section 130 for example receives data based on which an image is printed on a sheet P from the user terminal 200.

The communication section 130 is also connected to a server 300. The server 300 is installed by for example a manufacturer or a seller of the multifunction peripheral 100. In response to an instruction from the control section 110, the communication section 130 transmits MFP information indicating the operation status of the multifunction peripheral 100. The MFP information includes information indicating the number of sheets printed. In the following description, the number of sheets printed may be referred to as a print count.

In addition, the server 300 is communicatively connected to a plurality of multifunction peripherals 100. The server 300 and the plurality of multifunction peripherals 100 together form an image forming system 100S. The server 300 receives MFP information from each of the multifunction peripheral 100. Each piece of MFP information indicates the operation status, including the print count, of the corresponding multifunction peripheral 100.

The multifunction peripherals 100 included in the image forming system 100S may have an identical structure or a different structure. The following description is directed to the case where the multifunction peripherals 100 included in the image forming system 100S are identical in structure.

Note that one or more user terminals 200 may be included in the image forming system 100S.

<Removal of Usage Restriction on Predetermined Function>

Each multifunction peripheral 100 has a plurality of functions. Examples of the functions include print-related functions, such as a function of printing an image on an enlarged or reduced scale, a function of combining multiple pages into one page, a function of adjusting image density, and a function of selecting a sheet size. Note that the functions mentioned above are examples and that the multifunction peripherals 100 may have various other functions.

According to the present embodiment, each multifunction peripheral 100 have a plurality of functions and usage of a predetermined number of functions among the plurality of functions is restricted. In the following description, each function on which a usage restriction is imposed is referred to as a predetermined function. Each multifunction peripheral 100 is shipped with default settings according to which usage of at least one of the functions of the multifunction peripheral 100 is restricted. Consequently, in the multifunction peripheral 100 as shipped, at least one predetermined function among the plurality of functions of the multifunction peripheral 100 is disabled. In other words, in the multifunction peripheral 100 as shipped, all the functions of the multifunction peripheral 100 except for any predetermined function are enabled.

Examples of the predetermined functions of the multifunction peripheral 100 include a duplex printing function of printing on both sides of a sheet P, a high-speed printing function of printing a sheet P with a conveyance speed set to high, a bar-code reading function of reading bar-codes or QR codes (registered Japanese trademark), and a wireless communication function of execution wireless communications with an external device. Functions on which usage restrictions are to be imposed according to the default settings of the multifunction peripheral 100 as shipped are not limited to any specific functions. According to the default settings of the multifunction peripheral 100 as shipped, the usage restrictions may be imposed on one or more functions other than the functions mentioned above or imposed on one or more functions in addition to the functions mentioned above.

With the aim of giving users an incentive to use the multifunction peripheral 100, the printing section 2 according to the present embodiment counts a print count, which is the number of sheets P printed and acquires the total of the print counts, which is the total number of sheets P having been printed. In the following description, the total of the print counts thus acquired is referred to as the "cumulative number of sheets". When the cumulative number of sheets reaches a predetermined number, the multifunction peripheral 100 removes the usage restriction on a predetermined function. The predetermined number is not limited to any specific number. In one example, the predetermined number may be a number on the order of a few thousands to a few tens of thousands. In a specific example, the predetermined number may be a ten thousand.

In one example, the control section 110 counts the print count and acquires the cumulative number of sheets. Unless the cumulative number of sheets reaches the predetermined number, the control section 110 does not enable the operation panel 8 to receive user input of settings to use a predetermined function. In other words, unless the cumulative number of sheets reaches the predetermined number, the user is not permitted to make settings to use the predetermined function. More specifically, unless the cumulative number of sheets reaches the predetermined number, the user is not permitted to use the predetermined function. Once the cumulative number of sheets reaches the predetermined number, the control section 110 enables the operation panel 8 to receive user input of settings to use the predetermined function. In other words, once cumulative number of sheets reaches the predetermined number, the multifunction peripheral 100 permits the user to use the predetermined function. More specifically, the multifunction peripheral 100 removes the usage restriction on the predetermined function. The following describes the usage restrictions imposed on functions of the multifunction peripheral 100 by way of an example focusing on the duplex printing function, which is a predetermined function.

Figure 3:
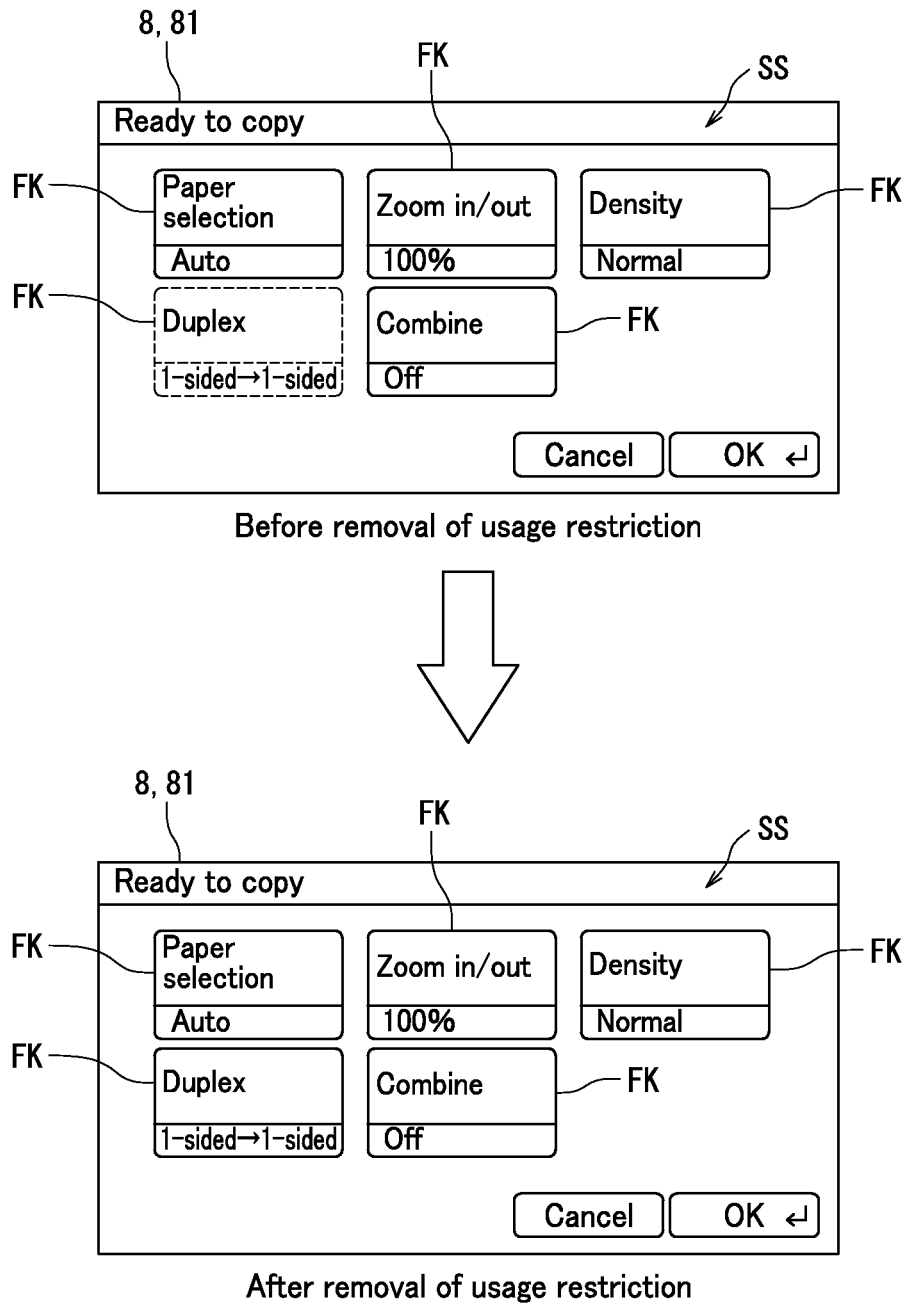
FIG. 3 shows an example of a setting screen (before and after removal of a usage restriction on a predetermined function) displayed on an operation panel of the multifunction peripheral according to the embodiment of the present disclosure.

First, the operation panel 8 displays a setting screen SS as shown in FIG. 3 for receiving settings on a plurality of functions related to printing. The setting screen SS includes a plurality of function keys FK associated with the respective print-related functions. Each function key FK is displayed with an indication of the function name and the current setting value. In response to a touch operation on any of the function keys FK displayed on the setting screen SS, the operation panel 8 displays a setting input screen (not shown) for receiving input of settings of the function associated with the function key FK having received the touch operation. On the setting input screen displayed on the operation panel 8, the user can make settings, including whether or not to use the functions listed on the setting input screen. In other words, the user is permitted to make input operations on the setting input screen in order to use the functions listed in the setting input screen displayed on the operation panel 8.

However, in a situation in which the cumulative number of sheets has not reached the predetermined number, the control section 110 instructs the operation panel 8 to disable a touch operation on the function key FK associated with the duplex printing function, which is one of the predetermined functions. More specifically, for example, the operation panel 8 may gray out the function key FK associated with the duplex printing function. In this state, the function key FK associated with the duplex printing function cannot be selected and thus a touch operation on the function key FK does not cause a screen transition of the operation panel 8 from the setting screen SS to the setting input screen. In short, the user is not permitted to use the duplex printing function. Alternatively to the gray-out, the function key FK associated with the duplex printing function may be hidden on the setting screen SS.

Once the cumulative number of sheets reaches the predetermined number, the control section 110 instructs the operation panel 8 to enable the function key FK associated with the duplex printing function, making the function key FK selectable by a touch operation. In other words, the operation panel 8 switches the display state of the function key FK associated with the duplex printing function from the gray-out display to a normal display. In this state, the function key FK associated with the duplex printing function is selectable and thus a touch operation on the function key FK causes a screen transition of the operation panel 8 from the setting screen SS to the setting input screen. Consequently, the user is permitted to input settings to use the duplex printing function. In short, the user is permitted to use the duplex printing function. The multifunction peripheral 100 may be set in advance as to one or more predetermined functions to be selectable for the usage restriction removal at a specific cumulative number of sheets. In this case, each time the cumulative number of sheets increases by the predetermined number, the multifunction peripheral 100 instructs the operation panel 8 to switch the display state to a normal state with respect to each function key FK associated with a predetermined function set to be selectable for the usage restriction removal at the current cumulative number of sheets. Each function key FK may be grayed out or hidden on the operation panel 8 as long as the usage restriction on the function associated with the function key FK is not removed at the current cumulative number of sheets.

When the usage restrictions are imposed on predetermined functions according to the default settings of the multifunction peripheral 100 as shipped, the usage restrictions may be removed one by one each time the cumulative number of sheets counted by the control section 110 increases by the predetermined number. In this case, the multifunction peripheral 100 may receive a user input of selecting one of the predetermined functions each time the cumulative number of sheets increases by the predetermined number and remove the usage restriction of the selected function. For each of the predetermined functions, a threshold cumulative number of sheets may be determined and the usage restriction on the corresponding function is set to be removable when the threshold cumulative number is reached. In such a case, the multifunction peripheral 100 may receive a user input of selecting a predetermined function from among predetermined functions having the usage restrictions set to be removable at the current cumulative number of sheets.

Figure 4:
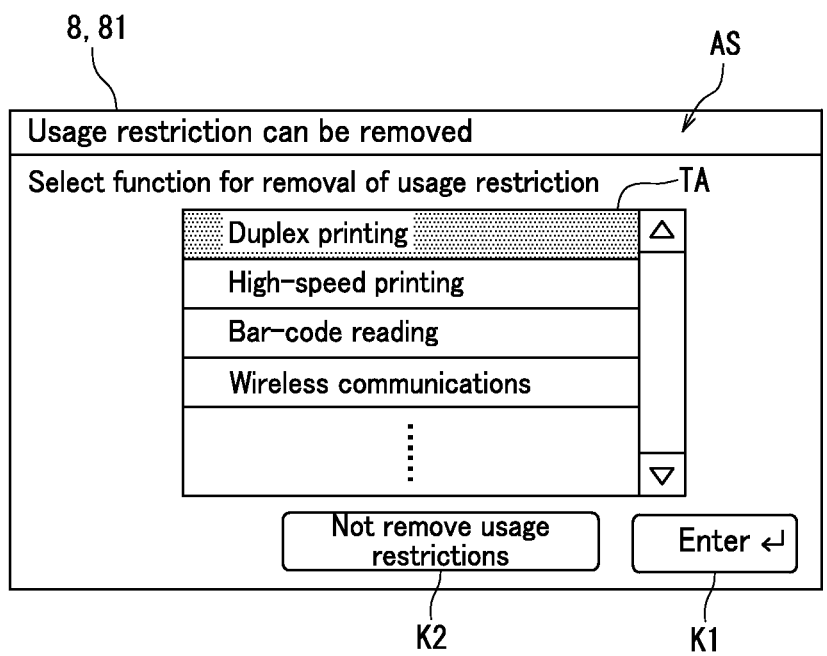
FIG. 4 shows an example of a selection input screen displayed on the operation panel of the multifunction peripheral according to the embodiment of the present disclosure.

For example, each time the cumulative number of sheets increases by the predetermined number, the control section 110 instructs the operation panel 8 to receive a user input of selecting a predetermined function for the usage restriction removal from among the predetermined functions. For receiving the user input, the operation panel 8 displays a selection input screen AS as shown in FIG. 4. The selection input screen AS includes a list TA of the predetermined function. The operation panel 8 displays the selection input screen AS with the list TA showing only predetermined functions that are currently under usage restrictions. According to the current cumulative number of sheets, the operation panel 8 may use a normal display state to display each function currently enabled and use a gray-out state to display each function currently disabled. In this case, from among the functions displayed on the operation panel 8, only those functions displayed in a normal display mode are selectable.

When the operation panel 8 detects a touch operation on an item in the list TA displayed on the selection input screen AS, the control section 110 determines that the user selects the predetermined function associated with the item selected by the touch operation. As an example, FIG. 4 shows a state in which an item associated with the duplex printing function is selected. When the operation panel 8 subsequently detects a touch operation on an entry key K1, the control section 110 removes the usage restriction on the function selected by the user from among the plurality of predetermined functions.

Although not shown in the figures, the operation panel 8 may display the selection input screen AS that includes predetermined functions corresponding to usage restrictions already removed. In addition, the operation panel 8 may display a guidance message in response to a touch operation on an item included in the list TA, the guidance message informing the user about the predetermined function associated with the item selected by the touch operation.

Figure 5:
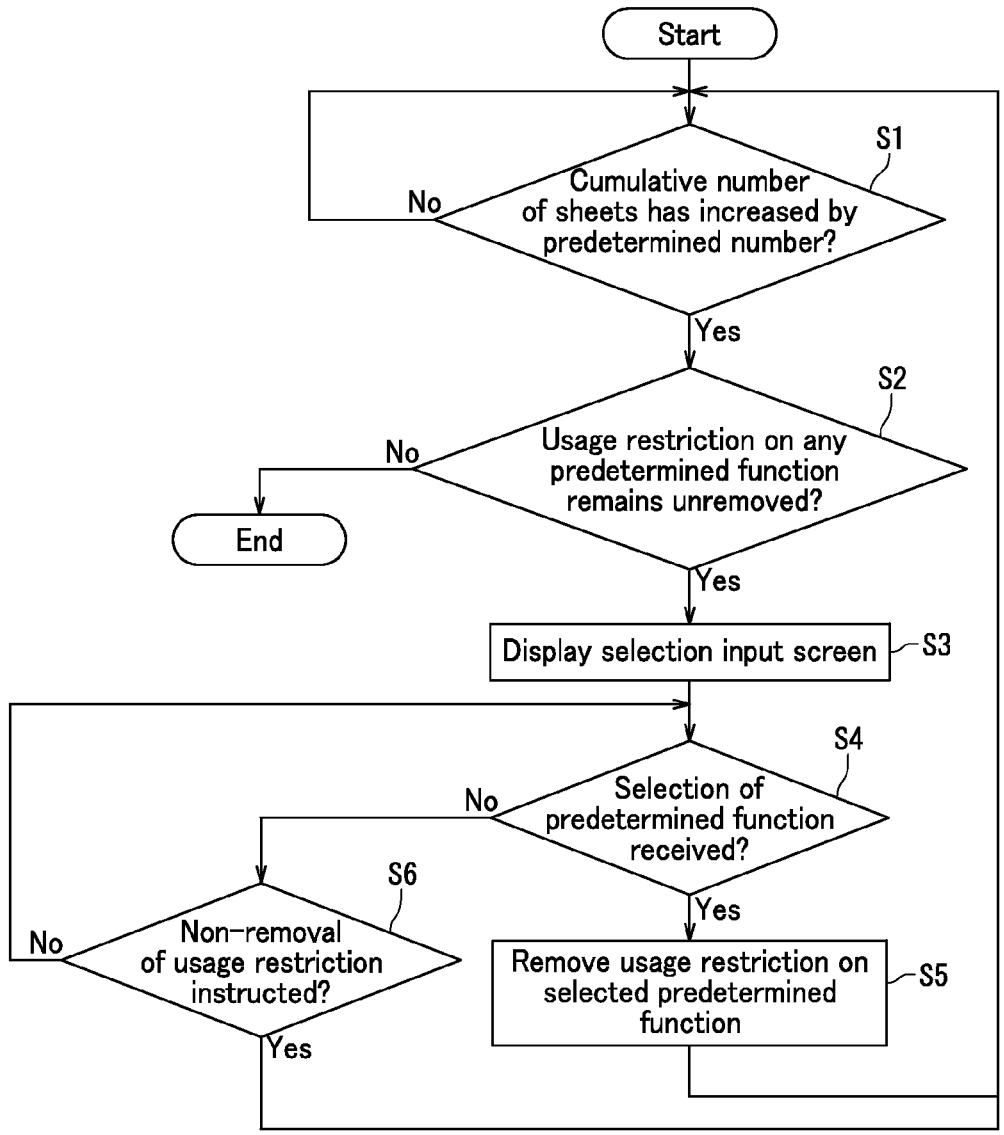
FIG. 5 is a flowchart of a process of removing a usage restriction on a predetermined function of the multifunction peripheral according to the embodiment of the present disclosure.

Next, with reference to the flowchart shown in FIG. 5, the following describes a processing flow of removing the usage restriction on a predetermined function. The flowchart shown in FIG. 5 starts when the multifunction peripheral 100 is powered on for the first time at a shipment destination, that is, when the multifunction peripheral 100 is activated at the shipment destination. Once the multifunction peripheral 100 is powered on at the shipment destination, the print count is started upon the first print job on the multifunction peripheral 100.

In Step S1, the control section 110 determines whether or not the cumulative number of sheets has increased by a predetermined number. On determining that the cumulative number of sheets has increased by the predetermined number, the control section 110 moves onto Step S2. On determining that the cumulative number of sheets has not increased by the predetermined number, the control section 110 repeats the determination in Step S1.

In Step S2, the control section 110 determines whether or not a usage restriction on any of the predetermined functions remains unremoved. On determining that a usage restriction on any of the predetermined functions remains unremoved, the control section 110 moves onto Step S3. On determining that no usage restrictions on the predetermined functions remain unremoved, the processing of removing a usage restriction on a predetermined function ends.

In Step S3, the control section 110 causes the operation panel 8 to display the selection input screen AS. In other words, the operation panel 8 receives a user input of selecting a predetermined function for the usage restriction removal from among the plurality of predetermined functions. In Step S4, the control section 110 determines whether or not a user input of selecting a predetermined function is received on the operation panel 8. On determining that a user input of selecting a predetermined function is received, the control section 110 moves onto Step S5 to remove the usage restriction on the predetermined function selected by the user. In order to receive a user selection of a predetermined function, the operation panel 8 may display, as selectable functions, all the predetermined functions or only a subset including one or more of the predetermined functions. The control section 110 then goes back to Step S1 to continue to count printed sheets.

On determining in Step S4 that a user input of selecting a predetermined function is not received, the control section 110 moves onto Step S6. In Step S6, the control section 110 determines whether or not a non-removal instruction instructing not to remove the usage restriction on the selected predetermined function is received from the user. On determining that a non-removal instruction is received from the user, the control section 110 moves onto Step S1. In other words, the control section 110 continues to count printed sheets without removing the usage restriction on the selected predetermined function. On determining that a non-removal instruction is not received from the user, the control section 110 goes back to Step S4. For receiving a non-removable instruction, for example, the selection input screen AS additionally includes a soft key K2 (see FIG. 4). When the operation panel 8 detects a touch operation on the soft key K2, the control section 110 determines that a non-removal instruction instructing not to remove the selected predetermined function is received.

<Providing Bonus Function>

The image forming system 100S according to the present embodiment provides a bonus function to one or more multifunction peripherals 100 having printed a relatively large number of sheets among the plurality of multifunction peripherals 100 included in the image forming system 100S. The bonus function to be provided to a multifunction peripheral 100 is not specifically limited to a specific function. Examples of possible bonus functions include a wallpaper function of displaying specific background wallpaper on the operation panel 8 and a music function of playing a specific piece of music during job execution. In a case where a multifunction peripheral 100 has already received the wallpaper function, a bonus function to be provided to the multifunction peripheral 100 may be wallpaper data different from the wallpaper data included in the initially provided wallpaper function. Similarly, in a case where a multifunction peripheral 100 has already received the music function, different music data may be provided as a bonus function to the multifunction peripheral 100.

The following describes how to determine a multifunction peripheral 100 to which a bonus function is provided. Specifically, from each of the plurality of multifunction peripherals 100 in the image forming system 100S, the server 300 receives a piece of information indicating the cumulative number of sheets of the multifunction peripheral 100. Then, the server 300 determines, for each of the plurality of multifunction peripherals 100, a number of sheets printed during a predetermined duration proceeding the time at which the determination is made. In the following description, the time at which the determination is made as to the numbers of sheets of the respective multifunction peripheral 100 is referred to as a determination time point. In addition, the predetermined duration preceding the determination time point is referred to as a determination period. The determination period may be on the order of a few months, for example. The determination time point and the determination period may be determined in advance on a voluntary basis by the administrator of the server 300, which may be the manufacturer or the seller of the multifunction peripherals 100.

Then, the server 300 ranks the multifunction peripherals 100 in decreasing order of the number of sheets printed during the determination period. The server 300 then transmits ranking information to each multifunction peripheral 100. The ranking information indicates the ranks of the respective multifunction peripheral 100. When each of the multifunction peripherals 100 receives the ranking information from the server 300, the corresponding control section 110 displays a rank screen LS showing a ranking table LT (see FIG. 6) on the operation panel 8. The ranking table LT is generated according to the ranking information. In one example, each of the multifunction peripherals 100 displays a ranking table LT that lists the rank of the multifunction peripheral 100 itself and the ranks of the other multifunction peripherals 100, along with the cumulative numbers of sheets of the respective multifunction peripherals 100.

The server 300 includes a threshold rank set in advance. The server 300 transmits a program for implementing a bonus function to each multifunction peripheral 100 that is ranked higher than the threshold rank among the plurality of multifunction peripherals 100. For example, the threshold rank may be set to be the rank No. 3, the server 300 transmits the program to each multifunction peripheral 100 having a rank higher than the rank No. 3. Ranks higher than the threshold rank may be referred to as high ranks. Through the above, the multifunction peripherals 100 at high ranks are enabled to execute the bonus function.

Figure 7:
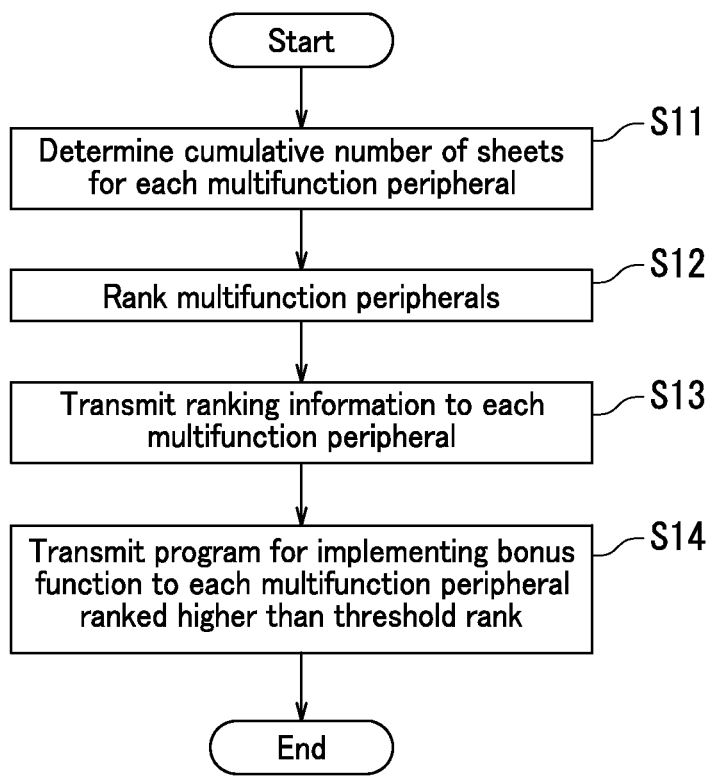
FIG. 7 is a flowchart of a process of providing a bonus function to the multifunction peripheral according to the embodiment of the present disclosure.

With reference to the flowchart shown in FIG. 7, the following describes the control flow for providing the bonus function to a multifunction peripheral 100. The flowchart shown in FIG. 7 starts upon the determination time point.

In Step S11, the server 300 determines, for each of the plurality of multifunction peripherals 100, the number of sheets printed by the multifunction peripheral 100 during the determination period. Subsequently in Step S12, the server 300 ranks the multifunction peripherals 100 in decreasing order of the number of sheets printed during the determination period.

In Step S13, the server 300 then transmits, to each multifunction peripheral 100, ranking information indicating the ranks of the respective multifunction peripherals 100. In Step S14, the server 300 transmits a program for implementing a bonus function to each multifunction peripheral 100 that is ranked higher than the threshold rank among the plurality of multifunction peripherals 100.

As described above, each multifunction peripheral 100 embodying an image forming apparatus according to the present embodiment includes the printing section 2 and the control section 110. The multifunction peripheral 100 has a plurality of functions. At least one of the plurality of functions is a predetermined function on which a usage restriction is imposed. The printing section 2 supplies toner to an electrostatic latent image to develop the electrostatic latent image into a toner image and prints the toner image on a sheet P. The control section 110 counts sheets P printed by the printing section 2. That is, the control section 110 acquires a cumulative number of sheets, which indicates the total number of sheets P printed by the printing section 2. When the cumulative number of printed sheets P reaches a predetermined number, the control section 110 removes the usage restriction on a currently disabled predetermined function from among the plurality of functions.

Each multifunction peripheral 100 according to the present embodiment removes the usage restriction on a predetermined function to enable the predetermined function when the cumulative number of sheets reaches the predetermined number. In other words, when the cumulative number of sheets reaches the predetermined number, the user of the multifunction peripheral 100 receives, as a bonus, a permission to use the predetermined function which has not been previously usable. This gives the user of the multifunction peripheral 100 an incentive to use the multifunction peripheral 100. In addition, the incentive to use the multifunction peripheral 100 is offered without requiring the entity in charge of managing the multifunction peripheral to prepare or deliver goods as a bonus item or a gift. In other words, no additional trouble of the managing entity of the multifunction peripheral 100 is involved. Therefore, the present embodiment can encourage the users to use the multifunction peripherals 100 without burdening the managing entity.

With such an incentive to use the multifunction peripherals 100, the users are expected to use the multifunction peripherals 100 more frequently. Naturally, the consumption of toner is expected to increase, which serves as a sales promotion of toner.

In each multifunction peripheral 100 according to the present embodiment, each time the cumulative number of sheets increases by the predetermined number, the control section 110 removes a usage restriction that is not yet removed among the usage restrictions on predetermined functions. Through this arrangement, the multifunction peripheral 100 can give an incentive to use the multifunction peripheral 100 on a continual basis (i.e., over a long period of time).

In each multifunction peripheral 100 according to the present embodiment, the operation panel 8 serving as a receiving section receives a user input of selecting a predetermined function for the usage restriction removal, each time the cumulative number of sheets increases by the predetermined number. The control section 110 then removes the usage restriction on the predetermined function according to the selection received on the operation panel 8. This allows the user to select a predetermined function for removal of the usage restriction. In other words, the user can remove the usage restriction on a predetermined function that the user desires to use. This improves the user convenience.

The image forming system 100S according to the present embodiment includes a plurality of multifunction peripherals 100 and a server 300 as described above. The server 300 is communicatively connected to the plurality of multifunction peripherals 100 and receives, from each of the plurality of multifunction peripherals 100, information indicating the cumulative number of sheets of the multifunction peripheral 100. The server 300 then determines, for each of the plurality of multifunction peripherals 100, the number of sheets printed during a determination period, which is a time period set in advance for making the determination. Then, the server 300 ranks the multifunction peripherals 100 in decreasing order of the number of sheets printed during the determination period. The server 300 then transmits, to each of the plurality of multifunction peripherals 100, ranking information indicating the ranks of the respective multifunction peripherals 100. Upon receipt of the ranking information from the server 300, each of the plurality of multifunction peripherals 100 causes the operation panel 8 serving as a display section to display a ranking table LT that is generated according to the ranking information.

As above, in the image forming system 100S according to the present embodiment, each of the plurality of multifunction peripherals 100 displays the ranking table LT on the corresponding operation panel 8. This is effective to promote competition among the users of the respective multifunction peripherals 100, which is expected to provide more incentive to use the multifunction peripherals 100.

In the image forming system 100S according to the present embodiment, the server 300 transmits a program for implementing a bonus function to each multifunction peripheral 100 that is ranked higher than the threshold rank. This is effective to give the users motivation to raise the rank of the respective multifunction peripheral 100 assigned to the users. Naturally, the multifunction peripherals 100 are expected to be used more frequently.

It is naturally appreciated that the embodiment described above are illustrative only in every aspect and are not to be construed as limiting. The scope of the present disclosure is shown by the appended claims and not by description of the embodiment given above. The present disclosure covers any alterations possible within the meaning and the scope equivalent to the scope the appended claims.

What is claimed is:

1. An image forming apparatus having a plurality of functions that includes at least one predetermined function on which a usage restriction is imposed, the image forming apparatus comprising:
    a printing section configured to supply toner to an electrostatic latent image to develop the electrostatic latent image into a toner image and print the toner image on a sheet; and
    a control section configured to
        count sheets printed by the printing section; and
        remove the usage restriction on the at least one predetermined function when a cumulative number of sheets printed by the printing section reaches a predetermined number;
    wherein the at least one predetermined function comprises two or more predetermined functions on each of which a usage restriction is imposed, and
    each time the cumulative number of sheets increases by a predetermined number, the control section removes a usage restriction that is not yet removed among the usage restrictions on the two or more predetermined functions.

2. The image forming apparatus according to claim 1, further comprising
    a receiving section configured to receive a selection by a user of one of the two or more predetermined functions each time the cumulative number of sheets increases by a predetermined number, wherein
    each time the cumulative number of sheets increases by the predetermined number, the control section removes the usage restriction on one of the two or more predetermined functions according to the selection received by the receiving section.

3. An image forming system comprising:
    a plurality of image forming apparatuses each according to claim 1, and
    a server communicatively connected to the plurality of image forming apparatuses and configured to receive, from each of the image forming apparatuses, information indicating a cumulative number of sheets printed by the image forming apparatus, wherein
    each of the image forming apparatuses includes a display section for displaying information,
    the server determines, for each of the image forming apparatuses, a number of sheets printed during a determination period having a duration set in advance for the determination of the number of sheets,
        ranks the plurality of image forming apparatuses in decreasing order of the number of sheets determined to have been printed during the determination period, and
        transmits ranking information to each of the image forming apparatuses, the ranking information indicating ranks of the respective image forming apparatuses, and
    on receiving the ranking information from the server, each of the image forming apparatuses displays a ranking table generated according to the ranking information on the display section.

4. The image forming system according to claim 3, wherein
    the server transmits a program for implementing a predetermined bonus function to each image forming apparatus that is ranked higher than a predetermined threshold rank.

* * * * *